June 13, 1967     N. A. CARLSON     3,325,206
CAMPING-TRAILER

Filed May 7, 1965     3 Sheets-Sheet 1

INVENTOR.
NORMAN A. CARLSON
BY David K. Kilgore
ATTORNEY

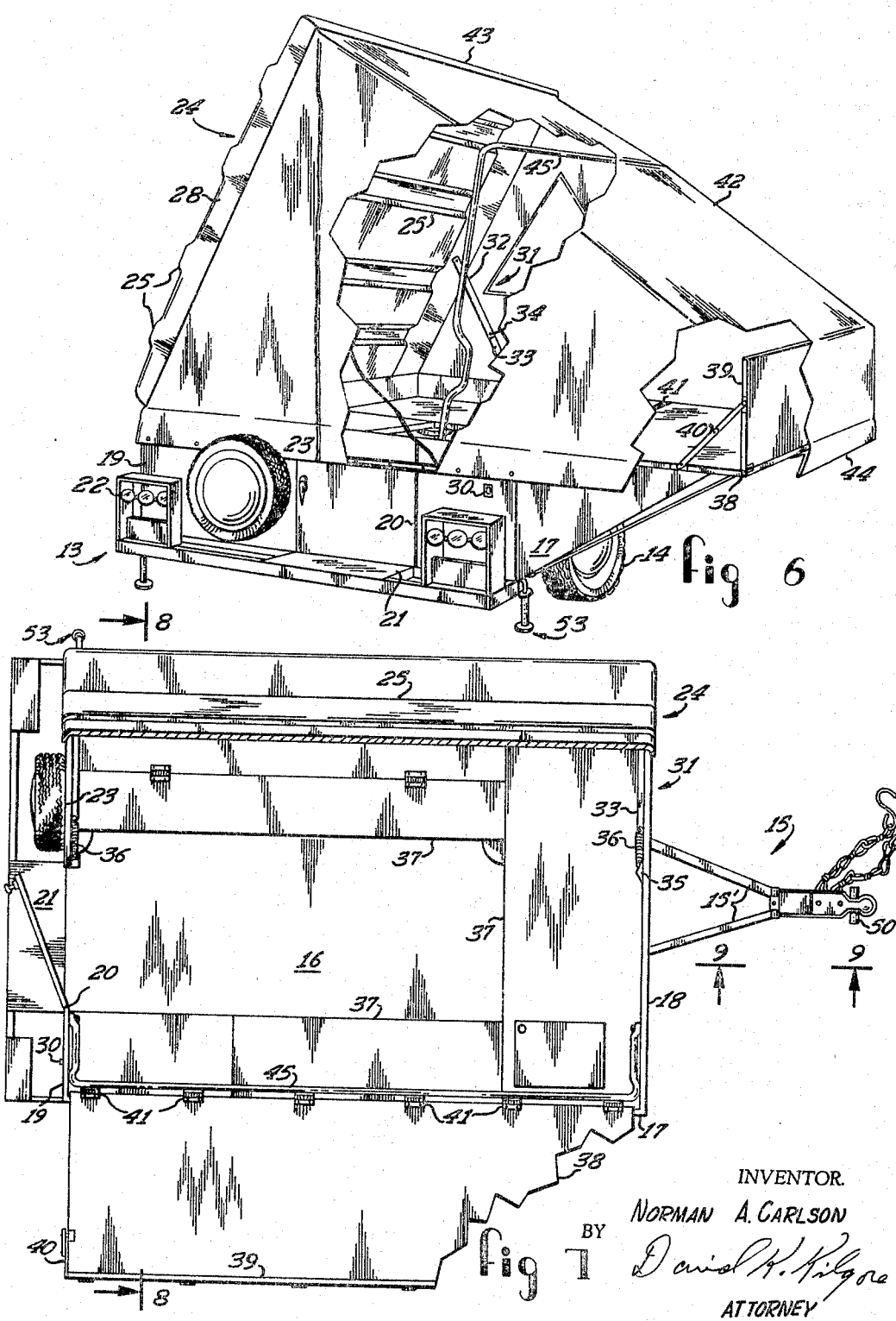

June 13, 1967 N. A. CARLSON 3,325,206
CAMPING-TRAILER
Filed May 7, 1965 3 Sheets-Sheet 3
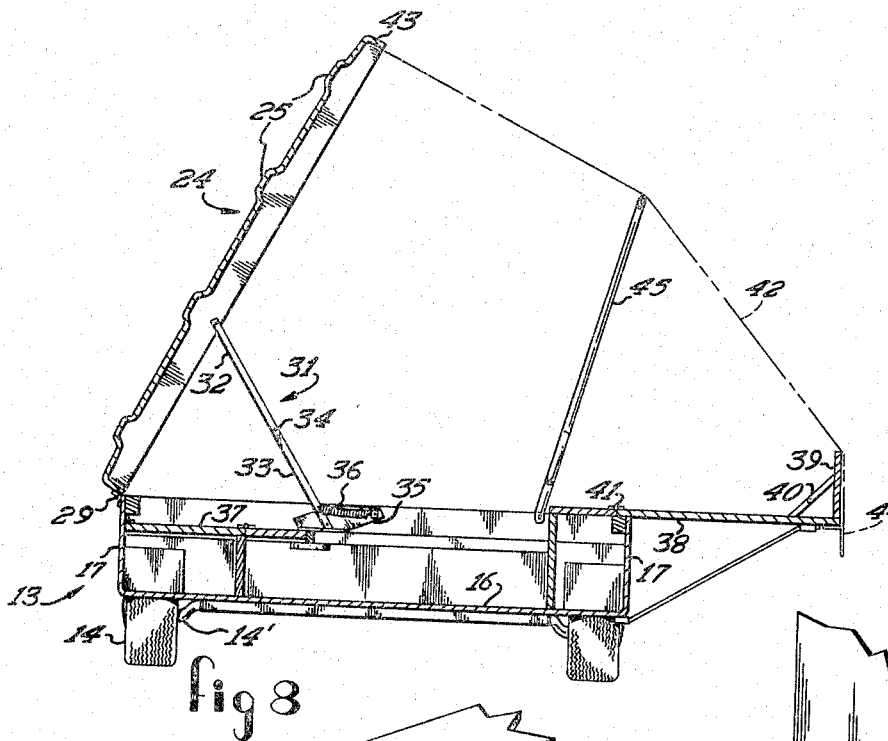
fig 8
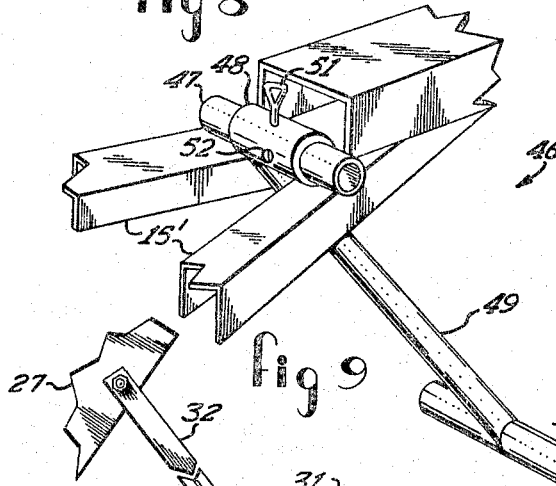
fig 9
fig 11
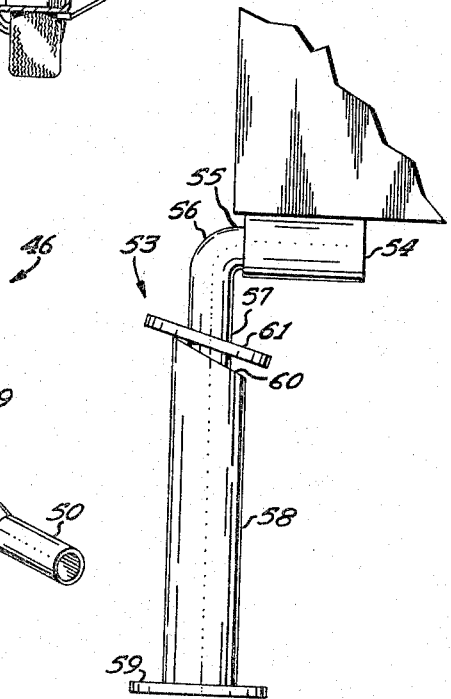
fig 10
INVENTOR.
NORMAN A. CARLSON
BY
ATTORNEY

United States Patent Office 3,325,206
Patented June 13, 1967

3,325,206
CAMPING-TRAILER
Norman A. Carlson, Minneapolis, Minn., assignor to Bethany Fellowship, Incorporated, Minneapolis, Minn., a corporation of Minnesota
Filed May 7, 1965, Ser. No. 455,044
2 Claims. (Cl. 296—23)

This invention relates broadly to vehicular trailers; more particularly to a camping trailer; and specifically to a camping trailer that is readily and easily expansible to provide living and sleeping quarters, and conversely, is collapsible to facilitate the towing of the same in transport.

The principal object of this invention is to provide a camping trailer wherein its superstructure is expansible and conversely collapsible.

Another object of this invention is to provide a camping trailer wherein the roof of the same is a combination of rigid and resilient members that may be erected to entirely cover the body of the trailer.

A further object of this invention is to provide a camping trailer wherein the rigid portion of its roof is constructed and arranged to afford a weathertight cover for the said trailer body when the roof is collapsed for transport.

A further object of this invention is to provide a camping trailer wherein the resilient portion of the roof is storable within the weathertight trailer body when said roof is collapsed for transport.

A still further object of this invention is to provide a camping trailer wherein the provision for covered sleeping quarters is expansible beyond the limits of the trailer body, said expansible sleeping quarters being foldable within the weathertight limits of the said trailer body when the camping trailer is in transport.

These and other objects of the invention will become apparent from the following specification and claims when taken in conjunction with the appended drawings which form a part of this application, and in which drawing, like characters indicate like parts throughout the several views.

To the above end, generally stated, the invention consists of the following devices and combination of devices hereinafter described and defined in the claims.

Referring to the drawings:

FIG. 6 is a perspective view taken from the rear of the trailer with the roof erected and the expansion open, some parts being broken away to illustrate interior body construction.

FIG. 7 is a top plan view of the camping trailer with its resilient roof section removed and the rigid roof section broken away and sectioned and showing the expansion open.

FIG. 8 is a rear elevational view of the camping trailer partly in section and illustrating the supporting means for the rigid and resilient roof sections with the expansion fully open.

FIG. 9 is an enlarged fragmentary detailed perspective view of the draw bar and frame of the camping trailer showing supporting means for said trailer when the same is detached from a towing vehicle.

FIG. 10 is an enlarged fragmentary detailed view in rear elevation showing supporting and leveling means for the rear end portion of the camping trailer when the same is detached from a towing vehicle, and FIG. 11 is an enlarged detailed view of one of the supporting means for the rigid roof section and also showing counter-balancing spring therefore.

Figure 1:
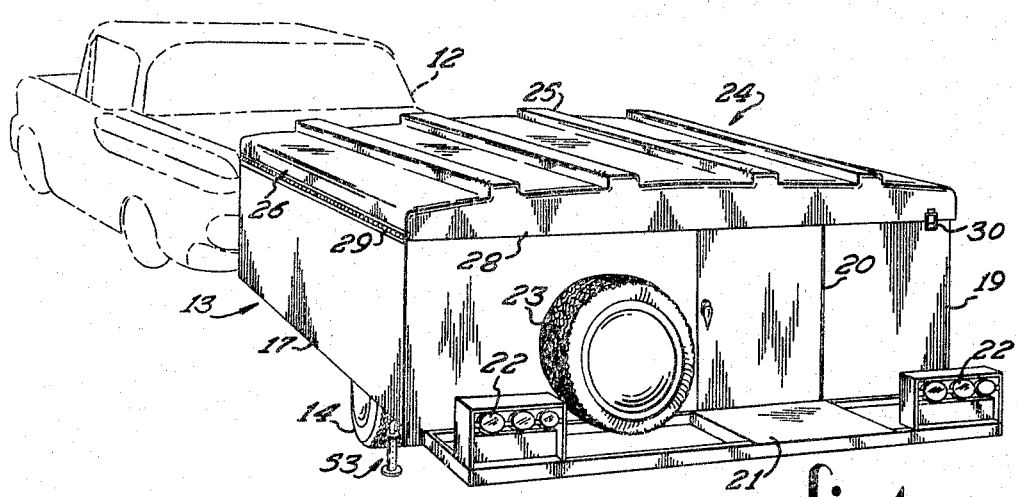
FIG. 1 is a perspective view of the camping trailer in transport taken from the rear and showing a towing vehicle by means of broken lines.
Figure 2:
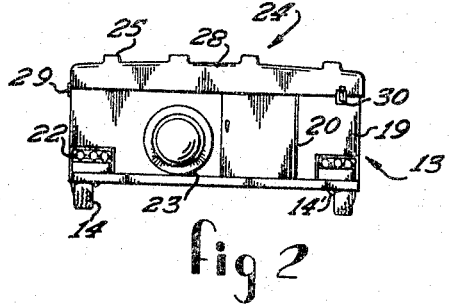
FIG. 2 is a rear elevation of the same.

The numeral 12 is directed to a diagrammatic view of an automotive vehicle illustrated by means of broken lines and the numeral 13 is directed generally to the body of the camping trailer, said trailer having a pair of ground wheels 14 mounted on an axle 14', and a draw bar 15 secured to the trailer frame members 15' for detachable connection with the towing vehicle 12. The trailer body 13 is of unitary construction and comprises a bed 16 having integral upstand side member 17, and upstanding front end member 18 and a rear end member 19, the latter being provided with a door 20 to afford access to the interior of the trailer body 13.

A rearwardly projecting extension 21 of the bed 16 of the trailer body 13 affords a mounting station for a pair of laterally spaced warning and directional lights 22 and a spare tire 23.

When the subject camping trailer is in transport or not in use, the entire body portion thereof thusfar described, with the exception of the rearwardly projecting extension 21 may be covered and rendered weathertight by means of a rigid cover member 24 that is hingedly connected to the upper edge portion, as shown, of the upstanding left-hand side member 17 of the trailer body 13. An additional purpose of said rigid cover member 24 will presently appear.

This cover member 24 is preferably fabricated of fiberglass or an equivalent and is provided with a plurality of longitudinally disposed integral inverted channel-like sections 25 to impart rigidity and stiffness to the said cover member 24. This cover member is constructed and dimensioned to fit over the entire trailer body 13 and is further provided with downturned side portions 26 and downturned front and rear end portions 27 and 28 respectively to afford overlapping engagement with the side members 17 and the front and rear end members 18 and 19 respectively of the trailer body 13 to afford a weather-tight closure of said trailer body when same is in transport or not in use. It will be understood that the rigid cover member 24 is hinged at a point below the upper edge portion of one side member 17 to afford an overlapping closure of the hinged side portion 26 thereof with the upstanding side member 17 of the trailer body 13 on which hinge 29 are mounted.

Latch means 30 on the opposite side of the rigid cover member 24 from its hinged side 26 is provided to secure said rigid cover member 24 in engagement with the trailer body 13. As shown, the latch means 30 is mounted on the downturned rear flange 28 of the said cover member 24 and the downturned front flange 27 thereof for aligned cooperation with latch elements mounted adjacent the upper edge portions of the upstanding body member 18 and 19.

Figure 3:
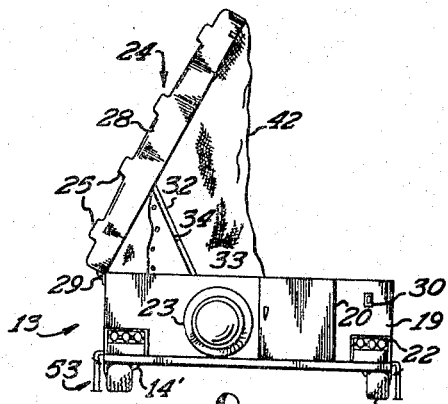
FIG. 3 is a rear elevation similar to FIG. 2 but showing the rigid roof section in erected position with the resilient section of the roof attached thereto.
Figures 4, 5:
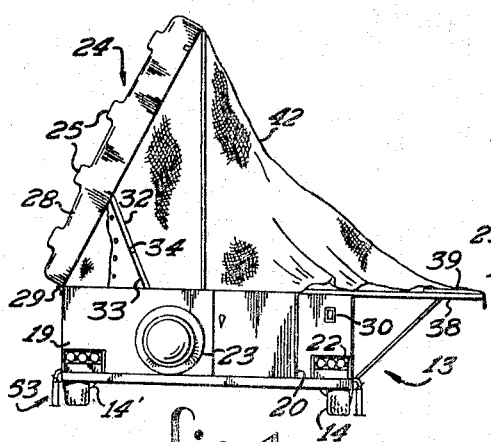
FIG. 4 is a rear elevational view similar to FIG. 3 further including an expansion member partially opened, and the resilient portion of the roof opened still further.
FIG. 5 is also a rear elevational view similar to FIG. 4 but showing the combined rigid and resilient roof sections substantially in place.

When the camping trailer is to be put in use for housing, the latch members 30 are released and the rigid cover member 24 pivoted on its hinges 29 is swung upwardly from the free unhinged side thereof into a substantially upright position, (see FIGS. 3, 4, and 5) and is so held positioned by means of front and rear supporting arms 31.

These supporting arms 31 comprise upper and lower sections 32 and 33 respectively, said sections being pivotally connected at 34 and are provided with suitable stop and lock means whereby said arms 31 are held in extended relation when the rigid cover member 24 is in an elevated position. The upper end section 32 of the said supporting arms 31 are pivotally mounted at the upper end portions thereof on the rigid cover member 24 and the lower sections thereof, are pivotally mounted on mounting plates 35 that are rigidly secured to the respective front and rear end upstanding body members 18 and 19.

A counter-balancing coiled spring 36 is mounted under strain between the lower end section 33 of the supporting arm 31 and the mounting plate 35 to facilitate raising and lowering movements of the rigid cover member 24.

Elevated above the floor or bed 16 of the trailer body 13, at the respective sides and front end portions thereof are sleeping facilities in the form of platforms which also serve as seating facilities and afford storage space therebeneath, said platforms being generally designated by the reference numeral 37. It will, of course, be understood that while not shown on the drawing, mattresses or resilient pads are provided for and supported by the respective platforms 37.

Expansion to afford greater sleeping facilities within the camping trailer is provided by means of a folding platform 38 having an upstanding foldable side member 39. This foldable side member 39 is held in upright position when in use by means of a conventional desk cover hinge 40, said hinge being in the form of a hanger placed at the front and rear end portion of said foldable side members being hingedly connected to the outer edge portion or the folding platform 38. A pair of front and rear brace members 40' are provided to support the folding platform 38 and extend from the side of the trailer body 13 upwardly and diagonally into engagement with the underside of the said platform 38.

The folding platform 38 is hingedly secured to the upstanding side member 17 on the opposite side of the trailer body from that on which the rigid cover member 24 is mounted. As shown in FIG. 7 a plurality of hinges 41 are employed to mount this platform 38 which is upwardly and inwardly swingable 180 degrees from its open position as best seen in FIGS. 6 and 7, to its closed position, wherein said platform 38 overlies a portion of the bed 16 of the trailer body 13, see FIG. 3, in which position said platform may also serve as a seat or a cover for underlying storage space.

Associated with the rigid cover member 24 to provide full roof coverage for the camping trailer and its expansion, is a resilient water and weather-tight cover member 42. This resilient cover member 42 is secured to the rigid cover member 24 along the underside of the downturned edge portion 26 of the free side portion 43 of said rigid cover member 24 and along the underside of the front and rear downturned edge portions 27 and 28 respectively of the said rigid cover member 24. From the aforesaid anchor points of the resilient cover member 42, the same is dimensioned to overlie that portion of the trailer body 13 not covered by the rigid cover member 24 including the open foldable expansion platform 38.

When the camping trailer expansion is open to afford greater sleeping quarters, the resilient cover member 42 is stretched from its respective anchor points on the rigid cover member 24 over the upstanding foldable side member 39 of the folding platform 38. A skirt portion 44 at the extreme outer end portion and the front and rear end portions thereof permits the resilient cover member 42 to be drawn down and completely cover the upstanding foldable side member 39 and thence be releasably secured along the bottom edge portion thereof and along the upper edge portion of the upstanding front and rear trailer body members 18 and 19 respectively.

To insure complete overall tautness of the resilient cover member 42 when the same is in its erected position, U-shaped supporting bow 45 is pivotally mounted at the lower end portion of each leg thereof to the upper edge portions of the front and rear upstanding body members 18 and 19 respectively of the trailer body 13 for free swinging movements about its respective pivot points. This U-shaped supporting bow 45 is dimensioned to engage the sloping resilient cover member 42 as the same extends from its anchor points on the rigid cover member to its connection with the foldable upstanding side member 39 of the folding expansion platform 38. The dimensions of this supporting bow 45 are such that when the transverse member thereof engaged the resilient cover member 42, it will force the same upwardly and outwardly by engagement therewith thereby imparting tautness of the said cover member and placing a slight outwardly projecting hump therein that causes said supporting bow 45 to remain in proper position relative to the resilient cover member 42.

When the camping trailer is detached from its towing vehicle 12, a supporting leg 46 is provided to support the front end portion. This supporting leg 46 is associated with the trailer frame members 15' and is mounted thereon for forwardly and rearwardly swinging movements. This supporting leg 46 comprises a fixed bearing 47 that is rigidly secured to the trailer frame members 15' rearwardly of the inner end portion of the drawbar 15. A transversely disposed collar 48 is mounted on the upper end portion of a depending leg member 49, said leg member being provided at its lower end portion with a rigid transversely disposed ground bar 50 which prevents the supporting leg 46 from sinking into loose ground. The collar member 48 is mounted on the fixed bearing 47 with a relatively close working fit for free movement about the longitudinal axis of said fixed bearing 47.

A key 51 is provided to engage aligned bores 52 in the bearing 47 and the collar 48 and is provided to hold the supporting leg 46 either in its ground-engaging position (see FIG. 9), or out-of-ground engagement when the same is swung rearwardly and upwardly to a position between and substantially parallel to the frame members 15' when the camping trailer is connected to a towing vehicle 12 while in transport.

Supporting and leveling means for the rear end portion of the camping trailer is provided by a pair of endwise adjustable leg members 53 secured to each rear corner of the trailer body 13. These leg members 53 are secured to the said trailer body by means of a fixed bearing 54 rigidly secured thereto, said fixed bearing constructed and arranged to receive the short leg 55 of a L-shaped member 56. The long leg 57 of the L-shaped member 56 is dimensioned to work with endwise movements within a tubular base or housing 58 having a ground-engaging flange 59. The upper end portion of said tubular housing 58 is angularly shaped (see numeral 60) and a relatively loose fitting washer 61 encircles the long leg 57 of the L-shaped member 56 above the tubular housing 58.

Thus, with the short leg 55 of the L-shaped member 56 journaled in the fixed bearing 54 for swinging movements about the longitudinal axis thereof, it is only necessary to first level the camping trailer and thence attach the adjustable members 53 to the fixed bearing and then adjust the entire assembly relative to the trailer and the ground. The washer 61 is then adjusted to bind on the long leg 57 of the L-shaped member 56 to prevent further telescopic movement of said member within the tubular housing 58.

It will, of course, be understood that various changes may be made in the form, details, arrangement and proportions of the various parts without departing from the scope of my invention.

What is claimed is:
1. A mobile collapsible camping trailer comprising,
a generally symmetrically shaped body structure having a front wall, a rear wall, and opposed longitudinally extending side walls,
a plurality of ground-engaging wheels supporting said body structure for fore and aft travel,
a generally rectangular-shaped rigid roof section having a longitudinal edge thereof hingedly connected with one of said side walls of said body structure for swinging movement between erect and collapsed positions, said rigid roof section when in the collapsed position engaging the body structure and substantially completely convering the upper surface thereof, and when the erect position being disposed in slightly oblique relation with respect to the vertical whereby said roof section overlies a minor portion of the upper surface of said body structure,
a pair of longitudinally spaced-apart arms, each extending between and pivotally connected to one of said front and rear walls of said body structure, and said roof section for supporting the latter in the erect position.
a flexible cover member having a longitudinal edge secured to the free longitudinal edge of the rigid roof section and to the opposed end portions thereof, said flexible cover member being movable between a collapsed position and an erect position, and when in the collapsed position being storable within the body structure,
releasable attachment means on the unhinged side wall of said body structure and on an edge portion of said flexible cover member for detachably connecting said body structure and cover member together,
a U-shaped support member having terminal portions thereof pivotally connected with the respective front and rear walls of said body structure for pivotal movement between a collapsed and erect position, said U-shaped support member when in the erect position projecting upwardly to engage the underside of the flexible member to tension the same, the volumetric space within the confines of the body structure, the roof section and the flexible member when in the erect position being sufficient to accommodate a plurality of occupants in a standing position,
a plurality of leveling and supporting mechanisms each comprising an inner leg element and an outer leg element interconnected together in telescoping relation, said inner leg element being pivotally connected to the under surface of said body structure and said outer leg element being engageable with the surface of the ground, said outer leg element having an angulated upper end defining a locking surface, and an annular locking element axially shiftable on said upper leg element and engaging the locking surface on said outer leg element for locking the leg elements in an adjusted position.

2. The camping trailer as defined in claim 1 wherein the pivotal axis of said U-shaped member is parallel to the pivotal axis of said roof section and is disposed adjacent that side wall of said body structure located oppositely of the side wall to which the roof section is hinged.

References Cited

UNITED STATES PATENTS

| 3,001,813 | 9/1961 | Josnson | 296—23 |
| 2,225,993 | 12/1940 | Hornberger | 296—23 |

FOREIGN PATENTS 807,639  10/1936  France.

BENJAMIN HERSH, *Primary Examiner.*

P. GOODMAN, *Assistant Examiner.*